United States Patent Office 3,356,834
Patented Dec. 5, 1967

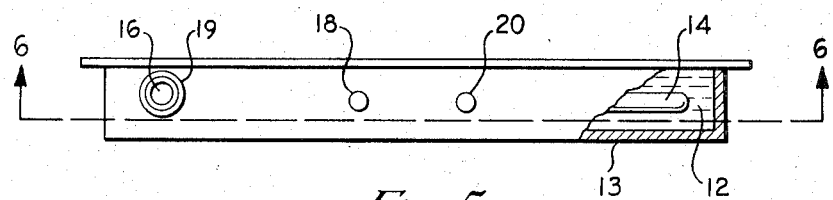
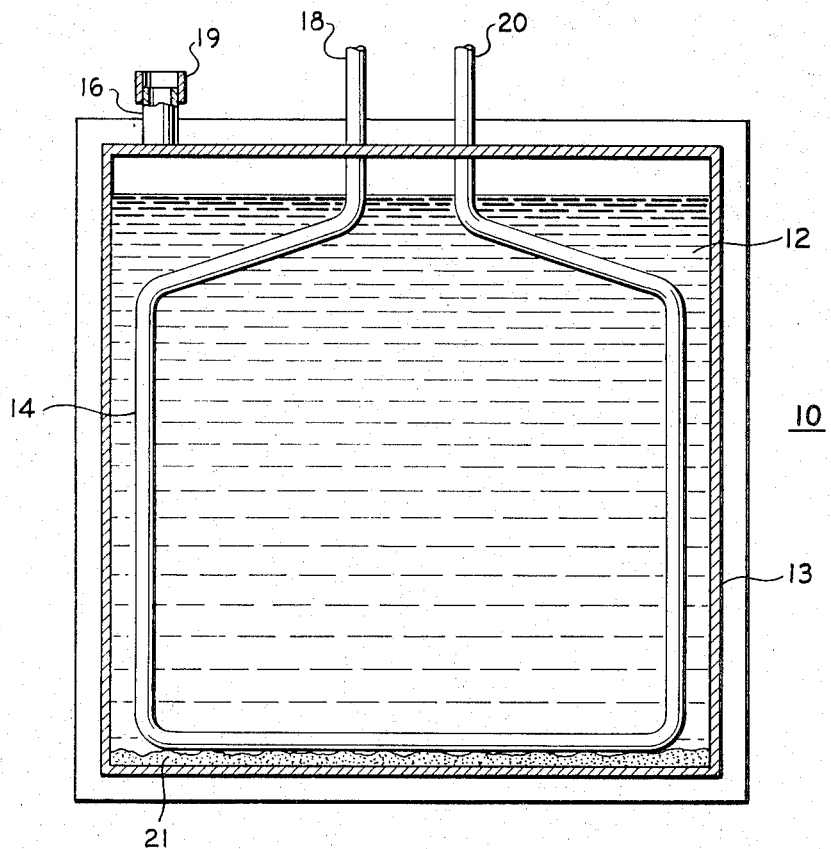

3,356,834
PROCESS AND APPARATUS FOR STORING HEAT
Matthew Mekjean, Niagara Falls, N.Y., assignor to Hooker Chemical Corporation, Niagara Falls, N.Y., a corporation of New York
Filed May 11, 1964, Ser. No. 366,471
4 Claims. (Cl. 219—530)

This invention relates to electric heaters. More particularly, it relates to electric heaters utilized in heating a heat storage medium.

It has recently been discovered that a composition comprising a major proportion of an alkali metal hydroxide and a minor proportion of modifiers therefor, such as disclosed in copending application S.N. 329,246, filed Dec. 9, 1963, can be utilized as the heat storage medium in a heat storage reservoir. An example of such a heat storage medium is a substantially anhydrous alkali metal hydroxide bath composition comprising a major proportion of sodium hydroxide, and a minor proportion of sodium nitrate and sodium chromate. Although several means of heating this type of heat storage medium have been proposed and may be utilized, it has been found that the utilization of off-peak electric power, converted directly into heat is an extremely efficient and economical way. Immersion electrodes may be utilized to heat the heat storage medium described above. When such a system is utilized, however, special electrical equipment is often demanded. Also, when electrodes are utilized, one or both of them may have to be replaced from time to time. To avoid the replacement of electrodes and the utilization of special electrical equipment, electrical resistance heating elements have been suggested for use in heating heat storage medium in the reservoir. Generally, the heating elements known to the prior art are less efficient and may fail after a time under the conditions present in an alkali metal hydroxide bath not exposed to air or gaseous oxygen, especially at the temperatures to which the bath is subjected, i.e., from about 60 to 680 degrees centigrade.

In accordance with this invention it has been found that an improved heating element in a heat storage unit comprising an electrical resistor means covered with a material selected from the group consisting of metals and alloys that oxidize to form substantially insoluble oxides will minimize undesirable effects of the alkali hydroxide heat storage medium at temperatures from about 60 to 680 degrees centigrade. In addition, it has been surprisingly found that the heating elements of the invention, when employed under the conditions described, i.e., as heaters for the heat storage medium, are capable of operating at higher temperatures than when they are utilized as heaters outside the heat storage medium. Thus, they are able to add heat to the medium at a very satisfactory rate.

For example, a heating element within the scope of the invention, e.g., Nichrome resistor covered or sheathed in insulating material and low carbon steel, heated outside the heat storage medium, may only reach a temperature of about 400 degrees centigrade before it begins to deteriorate due to atmospheric oxidation. On heating this element in the heat storage medium a temperature of approximately 820 degrees centigrade is obtainable, safely. Thus, about twice the amount of heat may be produced in the presence of the heat storage medium.

Other aspects and features of the invention will appear from the following description and the accompanying drawing in which:

FIG. 5 is a partially broken away plan view of a modified heat storage reservoir;

FIG. 6 is a vertical section along 6—6;

Figure 1:
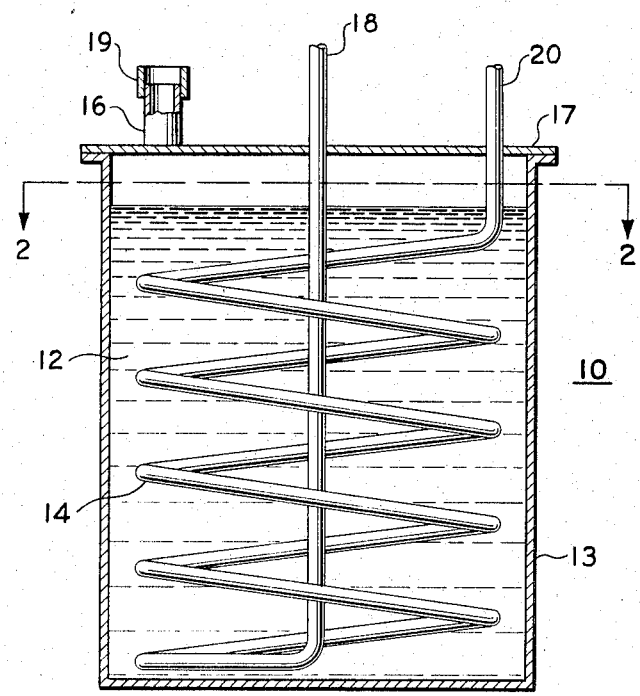
FIG. 1 is a central vertical section of a heat storage reservoir.
Figure 2:
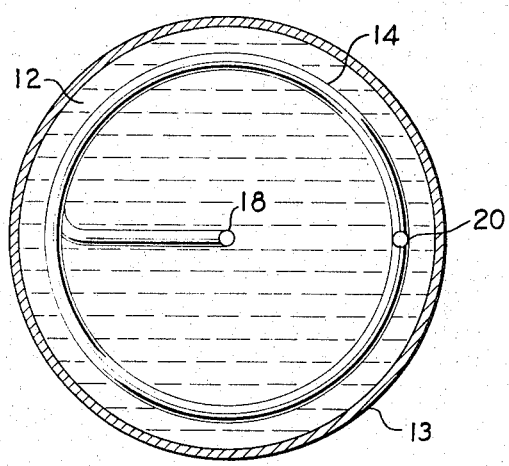
FIG. 2 is a horizontal section along 2—2.
Figure 3:
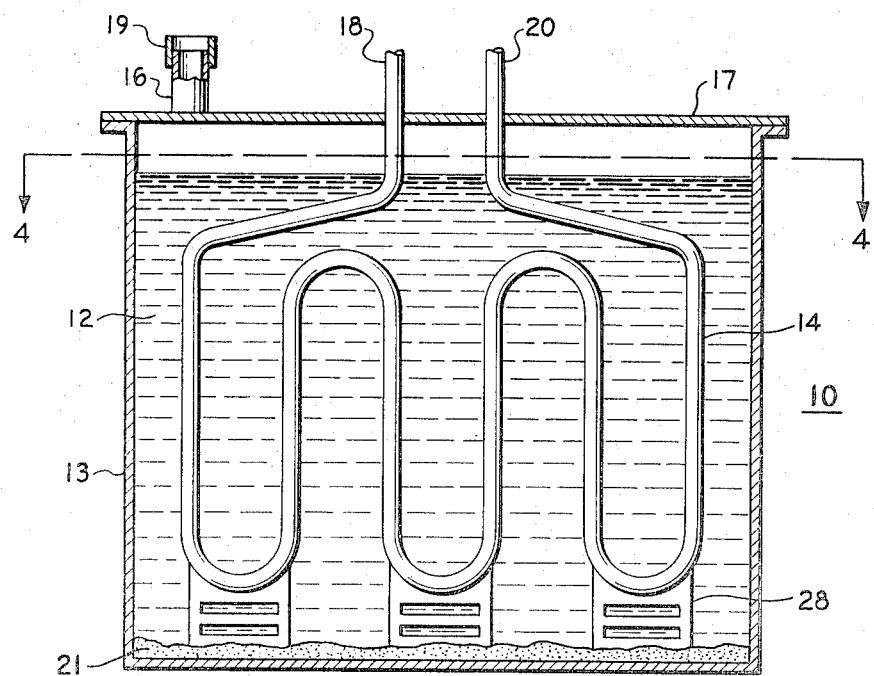
FIG. 3 is a central vertical section of a heat storage reservoir having a modified heating element therein.
Figure 4:
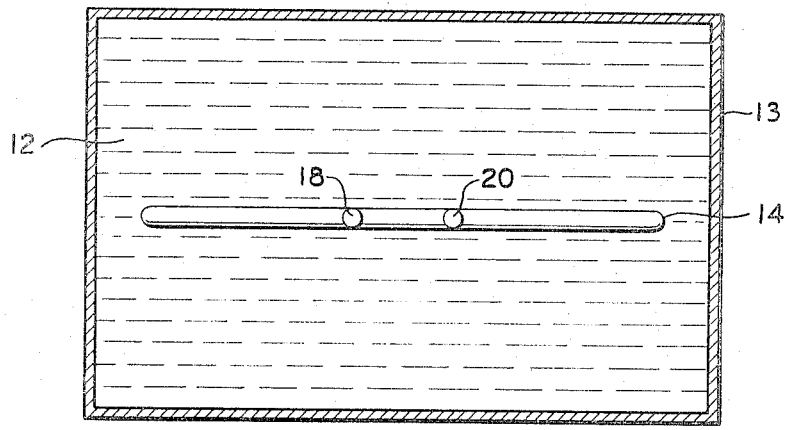
FIG. 4 is a horizontal section along 4—4.

In the drawing heat storage reservoir 10 contains heat storage medium 12 and electric heating element 14. Filling orifice 16 allows the heat storage medium to be added to the reservoir and sealed therein by coupling means 19. This coupling means is connected to a bellows means (not shown) which prevents atmospheric air from entering the reservoir 10. Reservoir 10 comprises walls 13 and cover 17 which are constructed of any suitable material such as American Iron and Steel Institute 1020 or lower steel classification or ductile iron. Terminals 18 and 20 of the heating element protrude from reservoir 10 through cover 17. These terminals are connected to a source of electricity (not shown). The areas where terminals 18 and 20 pass through cover 17 are sealed by known means to prevent air or other contaminants from entering reservoir 10. It is to be understood that in FIGURES 1–6, only diagrammatic illustrations of the various configurations of heat storage reservoirs 10 of heating elements 14 are shown. Other configurations can be readily adapted to the invention, the only requirement being that the configuration of the heating element be such as to allow the medium to heat efficiently and prevent the distortion of the walls of the reservoir 10 due to the expansion of the medium when it is heated. In FIGURES 7, 8, 9 and 10 various modified heating elements are shown having resistor 22 encompassed by insulating material 24, sheath 26 and having extensions 28 or protrusions 28 of, or from, the sheathing 26.

In operation the heat storage medium 12 will be heated by the electric heating element 14 to a temperature of about 680 degrees centigrade at which temperature the heating element is turned off. Air is passed over the reservoir, heated and carried by conduit means to various areas to be heated. The medium 12 cools at a slow rate and in most cases reheating of the medium is not required for about 24 hours. More details of the operation of the heat reservoir can be found in copending application S.N. 329,246.

Figures 7, 8:
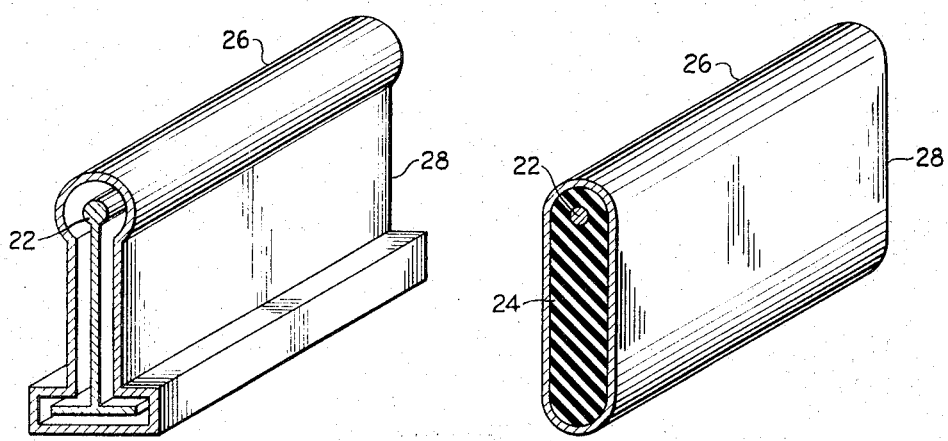
FIGS. 7, 8 and 9 are perspective views which illustrate various modifications of the heating element.
Figure 9:
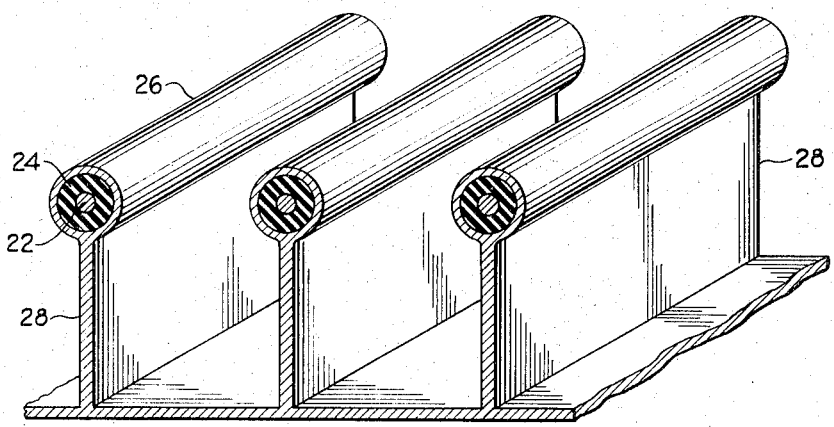
Figures 10, 11:
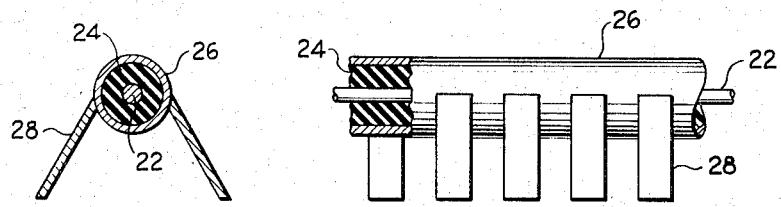
FIG. 10 is a vertical sectional view of another heating element.
FIG. 11 is a partially cutaway side elevation of part of the heating element of FIG. 10.

During the operation of the reservoir over a long period of time heat distribution in the element may become uneven due to by-product 21 build-up at the base of the reservoir which may cover part of the heating element. This buildup reduces the efficiency of the element 14. FIGS. 7–11, illustrate various structures which can be utilized to cause the heat created in resistor 22 to be more efficiently and uniformly distributed throughout the cell and to prevent burn outs of the heater. FIGURES 7–11 illustrate the adaptation of types of extensions 28 attached to or made part of the heating element. FIG. 7 shows an inverted T, FIG. 8 is an illustration of an oval, FIG. 9 shows a segmented extension and FIG. 10 shows an extension containing fins thereon.

These protrusions, or extensions, affixed to, or part of the covering material may be placed at the bottom or over the entire surface of the element. It is to be understood that the metal and alloy covering materials set forth herein are corrosion resistant in the medium at temperatures from 60 to about 680 degrees centigrade. These metals are oxidized to form oxide films on their surface that are substantially insoluble in the medium. It is preferred that the oxide film be completely insoluble in the medium, but films having a solubility not in excess of 500 parts per million parts of medium at 480 degrees centigrade are satisfactory.

Further, the metals and alloys that are utilized as covering material should have a melting point above the highest temperature obtainable by the alkali metal hydroxide bath. The thickness of the resistors and the covering materials are standard in the art and can be determined by referring to handbooks available to the art, such as Chemical Engineers Handbook, 3rd edition, published by "McGraw-Hill Book Company," New York, page 417 (1950). Examples of suitable sheathing or covering materials are low carbon steel or mild steel such as that bearing American Iron and Steel Institute Number 1020 and lower classifications; cobalt, nickel, ruthenium, rhodium, palladium, osmium, iridium, platinum, their alloys and other metals of Group VIII of the Periodic Table; zirconium, and gold. Some examples of alloy are Fe-Al, nickel steels including all percentages of Ni-Fe and up to 4 percent copper; cobalt alloys containing varying percentages of nickel, iron, silica, chromium and others; nickel alloys containing varying percentages of cobalt, nickel, chromium and others; nickel alloys containing up to 80 percent copper; ferrous alloys, as mild steel and nickel-molybdenum steel, and the like. In all of the above alloys, the carbon content is below 3.0 percent and preferably below 0.3 percent by weight. Many of the preferred alloys are sold under trademarks such as Haynes Stellite Alloy No. 3, 6, 93 and 157 manufactured by Haynes Stellite Co., Hastelloy Alloy A, B, C, D, F and X manufactured by Haynes Stellite Co., Monel K, KR, R and S manufactured by International Nickel Co. and Spang Chalfant 1, 2 and 3 manufactured by National Supply Co. The compositions of the above alloys are further described in Metals Handbook 1948 edition, published by "The American Society for Metals," Cleveland, Ohio, in Metals Handbook 8th edition volumes I and II published 1962–64 by "American Society for Metals," Metals Park, Novelty, Ohio, and Chemical Engineers Handbook 2d Edition published by "McGraw-Hill Book Co.," New York, 1941, pages 2108 through 2129.

These materials may be utilized to protect other good heat conductors which may form part of the protrusion 28, e.g., ductile iron many protect copper, silver or aluminum.

The heat storage media of this invention comprise a major proportion by weight of an alkali metal hydroxide and a minor proportion by weight of a non-reducing agent. Corrosion inhibitors may be added to this composition. These inhibitors may constitute from 0.1 to about 25 percent of the bath, alkali metal and alkaline earth metal chromates, dichromates, phosphates, pyrophosphates, manganates, permanganates, tetraborates, borates, iron particles and mixtures thereof such as potassium dichromate, sodium permanganate and so forth. By utilizing these inhibitors corrosion of metals in contact with the alkali metal hydroxide and inorganic non-reducing salt is substantially reduced to give a long life to the reservoir, the heating element and the medium. The term "non-reducing salt," as utilized in this description, means a salt which will yield an oxidizing bath or neutral bath. The terminology employed in the description is that utilized by the alloy steel industry where molten salt systems of an alkali metal hydroxide assist in the conversion, and subsequent removal of heat scale developed in annealing and hot rolling mill operations. These descaling salt baths are alkaline baths, e.g., molten caustic baths, and the type of additives incorporated in the caustic melt determines the classification of the bath. For example, if sodium nitrate, an oxidizing agent, is added to the caustic melt, an oxidizing bath is formed, whereas if a neutral agent (neither oxidizing nor reducing) is added, e.g., sodium sulfate, a neutral bath is formed. The term "non-reducing" means those additives that do not have a reducing effect on an alkali metal hydroxide salt bath. As indicated above, a minor proportion by weight of the non-reducing salt may be utilized in the practice of this invention.

Examples of alkali metal hydroxides that may be utilized in this invention are the hydroxides of potassium, sodium, lithium, rubidium, cesium, and mixtures thereof. From 1 to about 45 percent of the bath may consist of neutral additives. Among the neutral additives that may be added to a major proportion by weight of an alkali metal hydroxide or mixtures thereof, are the alkali metal and alkaline earth metal sulfates, phosphates, halides, carbonates, stannates, silicates, fluo silicates, fluoborates, tetraborates, metaborates, aluminates, bismuthates, borates, molybdates, tungstates, vanadates, and mixtures thereof, e.g., sodium carbonate, sodium sulfate, potassium sulfate, lithium carbonate, lithium iodate, and the like.

Examples of oxidizing agents which may be utilized in the heat storage media of the invention are alkali metal and alkaline earth metal, nitrates, nitrites, manganates, permanganates, chlorates, iodates, perchlorates, persulfates, chromates, dichromates, hypochlorites, oxides (e.g., perborates, $MnO_2$, $SnO$, $SnO_2$, $TiO_2$, $MoO_3$, $CrO_3$, $V_2O_5$, $P_2O_5$, $WO_3$) and mixtures thereof which will form non-reducing salts.

Examples of resistor element materials are Chromel A (78 percent nickel, 20 percent chromium, 2 percent manganese maximum and about 0.06 percent carbon) manufactured by Hoskins Manufacturing Company, Detroit, Michigan; Tophet A (80 percent nickel, 20 percent chromium manufactured by Wilbur B. Driver Co., Newark, New Jersey; Nichrome IV (80 percent nickel, 20 percent chromium) manufactured by Driver Harris Co., Harrison, New Jersey; and so forth.

From the above description it is seen that utilization of an insulation material between the resistance heater element and the heater sheath is preferred, primarily to prevent short-circuiting and subsequent loss of the heater. However, in unusual designs, the insulation material may be dispensed with, as in using the silicon-carbide sintered cylindrical rods which may be permitted to glow within the space provided in an open chamber or axially-parallel tube, which chamber protects them from direct contact with the heat storage medium. Of course, air, gas or other substance intermediate heater and tube may be considered to be the insulator.

Examples of insulation material that may be used between the resistance heater element and the sheathing material are magnesium oxide, zicronium oxide, zirconium silicate, titanium dioxide, beryllium oxide, calcium oxide. Such materials have specific heats in the range of 0.01 to 0.30 and are solids from 60 to 680 degrees centigrade.

It is apparent that the specific illustrations shown above have been given by way of illustration and not by way of limitation, and that the structures above described are subject to wide variation and modification without departing from the scope or intent of the invention. For example, it is also possible to provide heating elements that will pass through the heat storage media. That is, one terminal will be on the upper side of the heat reservoir and the other terminal will be at the lower side of the heat storage reservoir. It is to be further understood that not just one heating element per reservoir needs to be utilized but that many such heating elements may be employed depending upon the size of the heat storage reservoir and the temperatures desired. Also, it is to be understood that the protective sheathing materials above described, which are in direct contact with the heat storage medium, may be utilized as cladding materials over more thermally conductive metals such as copper, silver or aluminum.

What is claimed is:

1. A heating element comprising an electrical resistor in a substantially anhydrous alkali metal hydroxide heat storage medium, to heat said medium, and a cover of mild steel over the resistor.

2. A reservoir comprising a heat storage medium of a substantially anhydrous alkali metal hydroxide and a non-reducing salt, an electric heating element immersed in the medium and having resistor means to heat the medium, and a covering material of mild steel which contains less than about 0.3 percent carbon, said material covering said resistor.

3. The heating element of claim 1, wherein said cover is of a mild steel which contains less than about 0.3 percent carbon.

4. The heating element of claim 3, wherein said electrical resistor is in a substantially atmosphere-free heat storage medium, and wherein an insulation material separates said electrical resistor and said cover, thereby preventing short-circuiting of the heating element.

References Cited

UNITED STATES PATENTS

| | | | |
|---|---|---|---|
| 1,247,125 | 11/1917 | Madsen | 338—243 |
| 1,359,400 | 11/1920 | Lightfoot | 338—243 X |
| 2,457,596 | 12/1948 | Osterheld | 219—335 |
| 2,772,860 | 12/1956 | Nelson | 165—133 X |
| 2,791,204 | 5/1957 | Andrus | 219—378 X |
| 2,911,513 | 11/1959 | MacCracken | 219—378 X |
| 3,170,227 | 2/1965 | Richmond et al. | 165—142 X |

FOREIGN PATENTS 471,505    1937    Great Britain.

RICHARD M. WOOD, *Primary Examiner.*

R. F. STAUBLY, *Assistant Examiner.*